(12) United States Patent
Jeong et al.

(10) Patent No.: US 11,243,342 B2
(45) Date of Patent: Feb. 8, 2022

(54) DISPLAY APPARATUS

(71) Applicant: SAMSUNG ELECTRONICS CO., LTD., Suwon-si (KR)

(72) Inventors: Seung Jun Jeong, Suwon-si (KR); Sei Young Kang, Suwon-si (KR); Min Woo Kang, Suwon-si (KR); Nam Seok Roh, Suwon-si (KR); Kwan Sik Min, Suwon-si (KR); Jun Sung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 16/591,196

(22) Filed: Oct. 2, 2019

(65) Prior Publication Data

US 2020/0117048 A1 Apr. 16, 2020

(30) Foreign Application Priority Data

Oct. 15, 2018 (KR) .................. 10-2018-0122272

(51) Int. Cl.
*F21V 8/00* (2006.01)
*G02F 1/1335* (2006.01)
*G02B 5/02* (2006.01)

(52) U.S. Cl.
CPC ......... *G02B 6/0053* (2013.01); *G02B 6/0051* (2013.01); *G02B 5/0263* (2013.01);
(Continued)

(58) Field of Classification Search
CPC .. G02B 6/0063; G02B 6/0038; G02B 6/0035; G02B 6/0053; G02B 5/0263; G02B 6/0051; G02B 5/0231; G02F 1/133502
See application file for complete search history.

(56) References Cited

U.S. PATENT DOCUMENTS 5,600,462 A * 2/1997 Suzuki ................. G02B 5/0231
349/112
8,408,775 B1 * 4/2013 Coleman .................. F21V 7/04
362/615

(Continued)

FOREIGN PATENT DOCUMENTS

EP          2587305 A1       5/2013
KR       10-2008-0023503    3/2008
WO     WO 2014/130860 A1    8/2014

OTHER PUBLICATIONS

International Search Report dated Jan. 17, 2020 in International Patent Application No. PCT/KR2019/010943.

(Continued)

*Primary Examiner* — Michael H Caley
*Assistant Examiner* — Jonathan Y Jung
(74) *Attorney, Agent, or Firm* — Staas & Halsey, LLP

(57) ABSTRACT

Disclosed herein is a display apparatus. The display apparatus includes a backlight unit configured to emit light, a display panel positioned in front of the backlight unit; and an optical film positioned in front of the display panel, and the optical film includes a base layer, a first refractive layer positioned in front of the base layer, a second refractive layer positioned in front of the first refractive layer and having a lower refractive index than the first refractive layer, a third refractive layer positioned at the rear of the base layer, and a fourth refractive layer positioned at the rear of the third refractive layer and having a lower refractive index than the third refractive layer.

16 Claims, 10 Drawing Sheets

(52) U.S. Cl.
CPC .......... *G02B 6/0035* (2013.01); *G02B 6/0038* (2013.01); *G02B 6/0063* (2013.01); *G02F 1/133526* (2013.01)

(56) References Cited

U.S. PATENT DOCUMENTS

| | | |
|---|---|---|
| 2006/0109681 A1 | 5/2006 | Kim et al. |
| 2007/0064294 A1* | 3/2007 | Hoshino .............. G02B 5/0257 359/237 |
| 2008/0013323 A1* | 1/2008 | Katsumoto .......... G02B 6/0053 362/311.06 |
| 2008/0129933 A1 | 6/2008 | Nishida et al. |
| 2012/0268687 A1* | 10/2012 | Kaida .................... B32B 27/08 349/61 |
| 2014/0049822 A1* | 2/2014 | Gollier .................. G02B 5/021 359/488.01 |
| 2016/0154272 A1* | 6/2016 | Kim ................. G02F 1/133504 349/68 |
| 2017/0115433 A1* | 4/2017 | Kim ........................ B32B 27/32 |
| 2018/0031907 A1* | 2/2018 | Lee .................. G02F 1/133502 |
| 2018/0149795 A1 | 5/2018 | Lee et al. |

OTHER PUBLICATIONS

European Search Report dated Dec. 10, 2019 in European Patent Application No. 19200296.2.
European Communication dated Feb. 12, 2021, in European Patent Application No. 19200296.2, 4 pages.

\* cited by examiner

DISPLAY APPARATUS

CROSS-REFERENCE TO RELATED APPLICATION(S)

This application is based on and claims priority under 35 U.S.C. § 119 to Korean Patent Application No. 10-2018-0122272, filed on Oct. 15, 2018, in the Korean Intellectual Property Office, the disclosure of which is incorporated by reference herein in its entirety.

BACKGROUND

1. Field

The disclosure relates to a display apparatus, and more particularly to a display apparatus including an optical film.

2. Description of Related Art

A display apparatus is a type of output device that visually displays data information such as characters and graphics, and images.

The display apparatus may include a self-emissive type display panel such as an organic light emitting diode (OLED) panel, or a non-self-emissive type display panel such as a liquid crystal display (LCD) panel.

A display apparatus having a liquid crystal display may include an optical film to improve a viewing angle. The optical film may include a plurality of refractive layers having different refractive indices. The optical film may improve the viewing angle of the display apparatus by utilizing the refraction phenomenon of light based on the refractive index difference among the plurality of refractive layers.

However, there is a limit in improving the viewing angle of a display apparatus using only an optical film that utilizes a refraction phenomenon of light caused by a refractive index difference among the plurality of refractive layers. When a material capable of maximizing the refractive index is used, the manufacturing cost of the optical film is increased.

SUMMARY

Therefore, it is an aspect of the present disclosure to provide a display apparatus having an improved viewing angle.

It is another aspect of the present disclosure to provide a display apparatus capable of reducing reflection of external light.

It is another aspect of the present disclosure to provide a display apparatus having an improved contrast ratio.

It is another aspect of the present disclosure to provide a display apparatus capable of simplifying a manufacturing process of an optical film.

It is another aspect of the present disclosure to provide a display apparatus capable of easily processing an optical film.

Additional aspects of the present disclosure will be set forth in part in the description which follows and, in part, will be obvious from the description, or may be learned by practice of the present disclosure.

In accordance with an aspect of the disclosure, a display apparatus includes a backlight unit configured to emit light, a display panel positioned to the front of the backlight unit, and an optical film positioned to the front of the display panel, and the optical film includes a base layer, a first refractive layer positioned to the front of the base layer, a second refractive layer positioned to the front of the first refractive layer and having a lower refractive index than the first refractive layer, a third refractive layer positioned to the rear of the base layer, and a fourth refractive layer positioned to the rear of the third refractive layer and having a lower refractive index than the third refractive layer.

The first refractive layer may include first patterns that each include a first inclined portion configured to totally reflect some beams of the light emitted from the backlight unit.

The second refractive layer may include a first filling portion filling between the first patterns of the first refractive layer.

The third refractive layer may include second patterns that each include a second inclined portion configured to refract at least a part of the light emitted from the backlight unit that passes through the fourth refractive layer.

The first inclined portion may have a greater inclination angle than the second inclined portion.

The first pattern may have a higher height than the second pattern.

The fourth refractive layer may include a second filling portion filling between the second patterns of the third refractive layer.

The first patterns and the second patterns may be embossed patterns.

A distance between the first patterns may be different from a distance between the second patterns.

Each of the first patterns may include a parallel portion extending parallel to a direction in which the first refractive layer extends.

The first refractive layer may include a pattern including a curved portion configured to totally reflect a portion of the light emitted from the backlight unit.

The third refractive layer may include a pattern including a curved portion configured to refract at least a portion of the light emitted from the backlight unit that passes through the fourth refractive layer.

The pattern may be an engraved pattern.

In accordance with another aspect of the disclosure, a display apparatus includes a display panel, and an optical film positioned to the front of the display panel, and the optical film includes a base layer, a first refractive layer positioned to the front of the base layer and including first patterns each including a first inclined portion configured to totally reflect a portion of light passing through the base layer, a second refractive layer positioned to the front of the first refractive layer and having a lower refractive index than the first refractive layer, a third refractive layer positioned to the rear of the base layer and including second patterns each including a second inclined portion configured to refract a portion of light incident from the display panel, and a fourth refractive layer positioned to the rear of the third refractive layer and having a lower refractive index than the third refractive layer.

The first patterns may be embossed patterns and the second refractive layer may include a first filling portion filling between the first patterns.

The second patterns may be embossed patterns or engraved patterns, and the fourth refractive layer may include a second filling portion filling between the second patterns.

The first inclined portion may have a greater inclination angle than the second inclined portion.

The first pattern may have a higher height than the second pattern.

A distance between the first patterns may be different from a distance between the second patterns.

In accordance with another aspect of the disclosure, a display apparatus includes a display panel, and an optical film positioned to the front of the display panel and the optical film includes a base layer, a first refractive layer positioned to the front of the base layer, and including first patterns each including a first inclined portion configured to totally reflect a portion of light passing through the base layer, a second refractive layer positioned to the front of the first refractive layer and having a lower refractive index than the first refractive layer, the second refractive layer including a first filling portion filling between the first patterns, a third refractive layer positioned to the rear of the base layer and including second patterns each including a second inclined portion having a less inclination angle than the first inclined portion, and a fourth refractive layer positioned to the rear of the third refractive layer and having a lower refractive index than the third refractive layer, the fourth refractive layer including a second filling portion filling between the second patterns.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
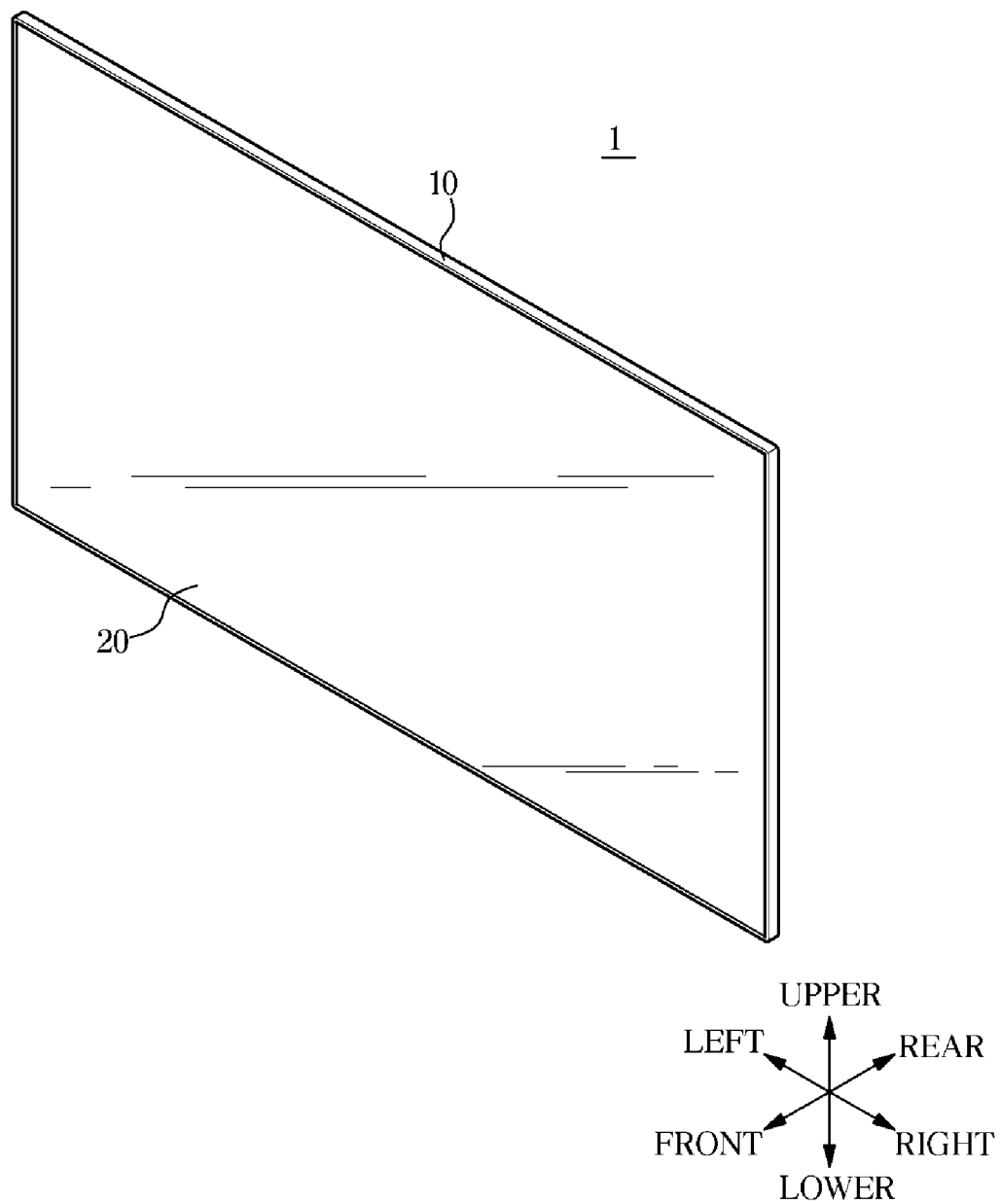
FIG. 1 is a view of a display apparatus according to an embodiment of the disclosure.

In the following description, like reference numerals refer to like elements throughout the specification. Well-known functions or constructions are not described in detail since they would obscure the one or more exemplar embodiments with unnecessary detail.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

Figure 2:
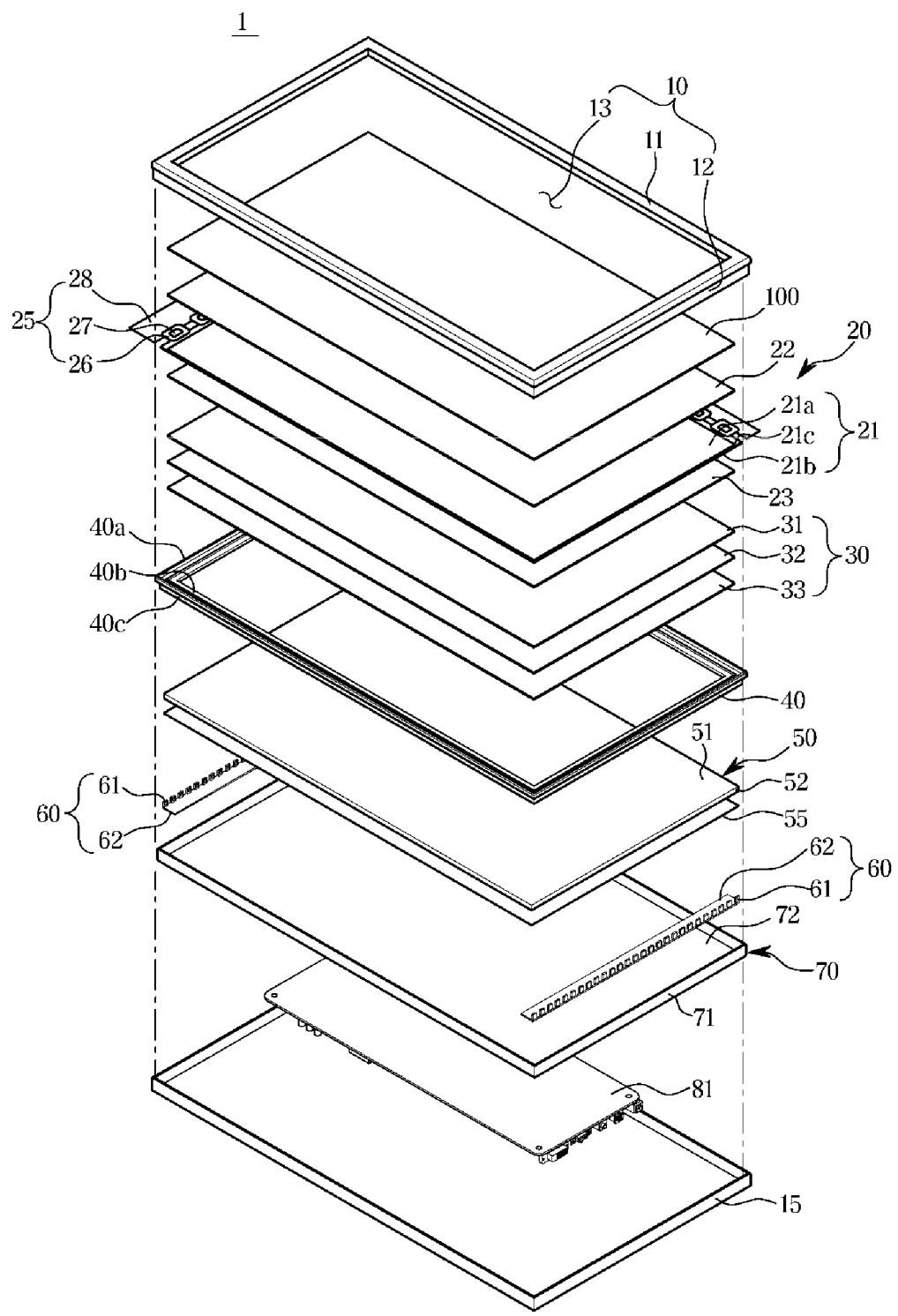
FIG. 2 is an exploded view of the display apparatus shown in FIG. 1.

FIG. 1 is a view of a display apparatus according to an embodiment of the disclosure. FIG. 2 is an exploded view of the display apparatus shown in FIG. 1.

Referring to FIGS. 1 and 2, according to an embodiment of the disclosure, a display apparatus 1 includes a top chassis 10, a display panel 20, a backlight unit 60, and a bottom chassis 70. The top chassis 10 is positioned in front of the display panel 20. The display panel 20 may be positioned in front of the backlight unit 60. The backlight unit 60 is positioned behind the display panel 20 to be apart from the display panel 20. The bottom chassis 70 may be positioned behind the display panel 20 and the backlight unit 60.

A middle mold 40 may be further provided between the display panel 20 and the backlight unit 60. The middle mold 40 may allow the display panel 20 to be supported apart from the backlight unit 60. A controller 81 configured to control a drive of the display apparatus 1 may be positioned behind the bottom chassis 70. A rear cover 15 forming a rear outer appearance of the display apparatus 1 may be provided behind the controller 81.

A plurality of optical sheets 30 may be provided at the rear of the display panel 20. A light guide plate 50 may be positioned at the rear of the optical sheet 30. A reflective sheet 55 may be positioned behind the light guide plate 50.

The optical sheet 30 includes a protective film 31, a prism film 32, and a diffusion film 33. The protective film 31 is positioned in front of the prism film 32 to protect the prism film 32 sensitive to scratches such as dust.

A triangular prism may be positioned in front of the prism film 32. Through the prim film 32, light diffused by the diffusion film 33 may be focused on in a direction perpendicular to a rear surface of the display panel 20. Two prism films 32 may be used. The light passing through the prism film 32 may travel perpendicularly to the display panel 20 so as to allow the display panel 20 to have a uniform brightness. Light passing through the light guide plate 50 may be diffused by the diffusion film 33 and supplied to the display panel 20.

The light guide plate 50 may be configured to allow light emitted from a light emitting diode 61 to be uniformly supplied to the diffusion film 33. The light guide plate 50 may include an exit surface 51 and an incident surface 52. The exit surface 51 may be located behind the diffusion film 33 and face one surface of the diffusion film 33. The incident surface 52 may be provided on the side surface to allow light emitted from the light emitting diode 61 to be incident thereon.

The reflective sheet 55 may be positioned behind the light guide plate 50. Light emitted through a lower surface of the light guide plate 50 may be guided to the light guide plate 50 again by the reflective sheet 55.

The backlight unit 60 includes a plurality of light emitting diodes 61 and a printed circuit board 62. The backlight unit 60 may be configured to emit light. The light emitting diode 61 may supply light to the light guide plate 50. The plurality of light emitting diodes 61 may be mounted on the printed circuit board 62.

The plurality of light emitting diodes 61 may be mounted to protrude from one surface of the printed circuit board 62. The plurality of light emitting diodes 61 may be arranged on a surface of the printed circuit board 62 at a predetermined distance.

The printed circuit board 62 may be positioned behind the reflective sheet 55. The printed circuit board 62 may be fixed to the bottom chassis 70 via a fastening member such as a screw or an attachment means such as a double-sided tape. As for the printed circuit board 62, a back surface of a surface on which the plurality of light emitting diodes 61 are mounted, may be fixed to a bottom surface 72 of the bottom chassis 70.

The display panel 20 may include a first substrate 21b including a thin film transistor (TFT) and a pixel electrode, and a second substrate 21a positioned on one side of the first substrate 21b and provided with a color filter and a driving source. A liquid crystal layer 21c may be provided between the first substrate 21b and the second substrate 21a. Polarizing sheets 22 and 23 may be attached to the rear of the first substrate 21b and/or the front of the second substrate 21a. A module in which the first substrate 21b, the second substrate 21a, and the liquid crystal layer 21c are combined may be referred to as a liquid crystal display module 21.

A driver 25 applying a driving signal may be provided on one side of the first substrate 21b. The driver 25 may include a flexible printed circuit board 26, a driving chip 27, and a circuit board 28. The driving chip 27 may be mounted on one side of the flexible printed circuit board 26. The circuit board 28 may be connected to the other side of the flexible printed circuit board 26.

A black matrix (not shown) may be formed on the second substrate 21a. A cable to which the driver 25 and the controller 81 are connected may pass through the rear space of the black matrix.

The display panel 20 may form a screen by adjusting the arrangement of the liquid crystal layer 21c. As a non-light emitting element, the display panel 20 may receive light from the backlight unit 60 and display an image.

An optical film 100 improving a viewing angle and/or a contrast ratio may be positioned in front of the display panel 20. Details of the optical film 100 will be described later.

The top chassis 10 may include a bezel 11 and a top lateral side 12. The bezel 11 may cover the front edge of the display panel 20. The top lateral side 12 may be bent downward from an end portion of the bezel 11. At least a part of the top lateral side 12 may be in contact with the bottom chassis 70. For example, at least one part of the top lateral side 12 may cover the outer side of a bottom lateral side 71.

The top chassis 10 may be provided with an opening 13 through which the display panel 20 is exposed. An effective display area, in which a screen is actually displayed on the display panel 20, may be exposed to the front side through the opening 13.

The bottom chassis 70 may include the bottom lateral side 71 and the bottom surface 72. The bottom lateral side 71 may extend upwardly along the circumference of the bottom surface 72. The backlight unit 60 may be seated on the bottom surface 72. A heat radiation sheet (not shown) may be positioned behind the bottom surface 72 of the bottom chassis 70.

The middle mold 40 may include a first support 40a, a second support 40b, and an extension portion 40c. The first support 40a and the second support 40b may extend to the inside of the middle mold 40. The second support 40b may extend inward from the first support 40a and extend downward from the first support 40a to be stepped. The extension portion 40c extends to the lower side of the middle mold 40. A part of the display panel 20 may be supported by the first support 40a. A part of the optical sheet 30 may be supported by the second support 40b. An outer surface of the extension portion 40c may be in contact with the inner surface of the bottom chassis 70.

The light emitting diode 61 may simultaneously emit light and heat. The printed circuit board 62 may serve not only to supply a driving signal to the light emitting diode 61 but also to transmit the heat generated by the light emitting diode 61 to the outside. That is, the heat generated in the light emitting diode 61 may be transmitted to the bottom chassis 70 through the printed circuit board 62. The printed circuit board 62 may be formed of a metal having a high thermal conductivity to increase heat transfer efficiency. For example, the printed circuit board 62 may be formed of a metal material including aluminum or copper.

A controller 81 may be mounted on the rear side of the bottom chassis 70. The rear cover 15 may be located behind the controller 81. The controller 81 may include a substrate and a plurality of electronic components mounted on the substrate. The electronic components may be mounted on the upper surface and/or the lower surface of the substrate. The plurality of electronic components may be mounted on or fixed to the substrate by a clamp.

Figure 3:
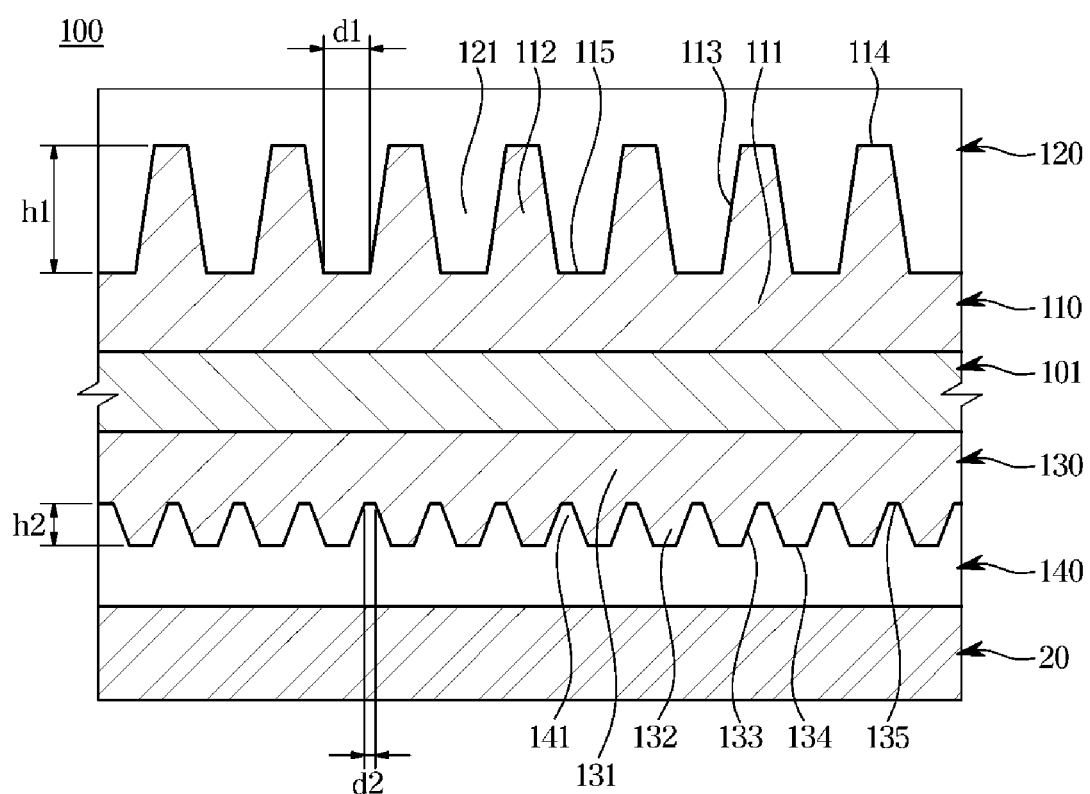
FIG. 3 is a cross-sectional view schematically illustrating an optical film shown in FIG. 2.
Figure 4:
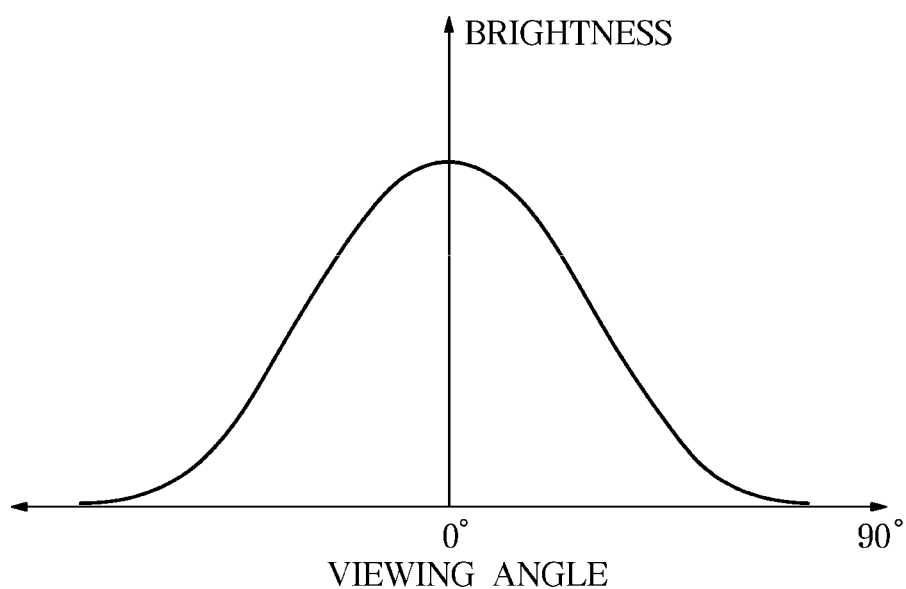
FIG. 4 is a view schematically illustrating a state in which light, which is incident on the optical film shown in FIG. 3, is refracted.
Figure 5:
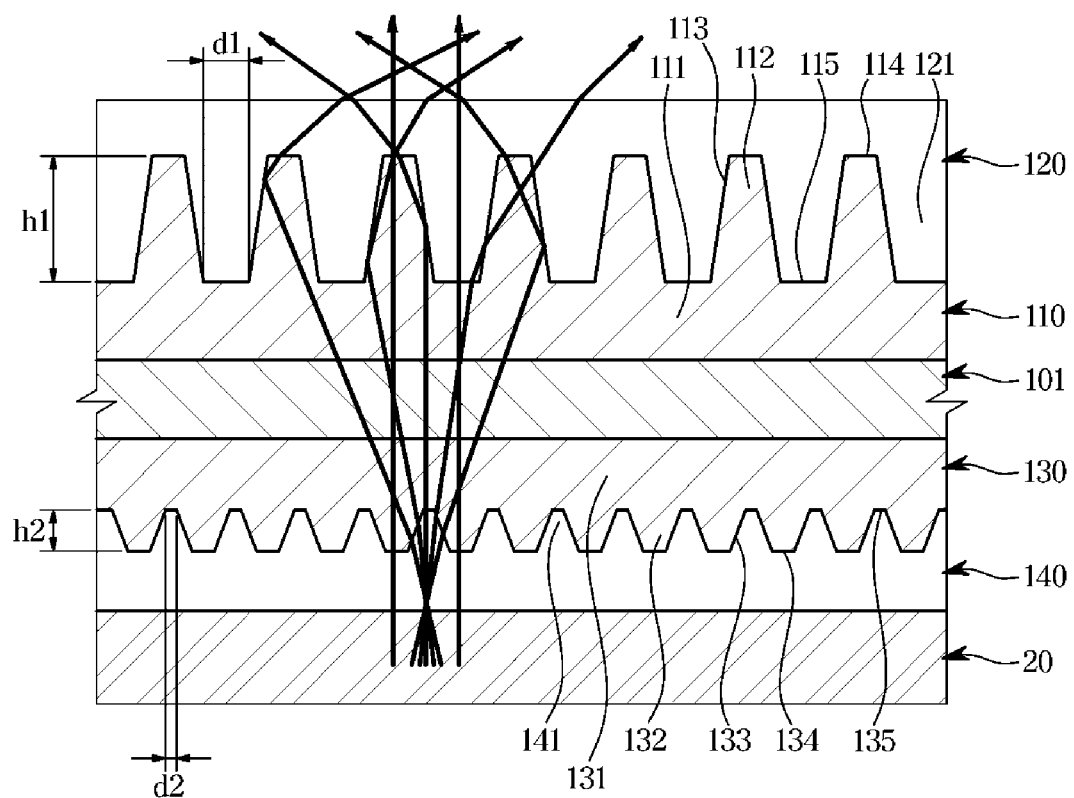
FIG. 5 is a graph illustrating the distribution of light emitted from a backlight unit shown in FIG. 2.

FIG. 3 is a cross-sectional view schematically illustrating an optical film shown in FIG. 2. FIG. 4 is a view schematically illustrating a state in which light, which is incident on the optical film shown in FIG. 3, is refracted. FIG. 5 is a graph illustrating the distribution of light emitted from a backlight unit shown in FIG. 2.

Referring to FIG. 3, the optical film 100 may include a base layer 101, a first refractive layer 110, a second refractive layer 120, a third refractive layer 130 and a fourth refractive layer 140. The first refractive layer 110 and the third refractive layer 130 may be provided as a high refractive layer 110 and 130 and the second refractive layer 120 and the fourth refractive layer 140 may be provided as a low refractive layer 120 and 140.

The base layer 101 may be positioned in front of the display panel 20. The base layer 101 may be positioned in front of the polarizing sheet 22 of the display panel 20. The base layer 101 may be arranged between the first refractive layer 110 and the third refractive layer 130.

The base layer 101 may extend along a plane perpendicular to the front and rear direction. Light passing through the display panel 20 may pass through the base layer 101.

The first refractive layer 110 may be positioned in front of the base layer 101. The first refractive layer 110 may extend along a plane perpendicular to the front and rear direction. The first refractive layer 110 may include a first body layer 111 and a first pattern 112 formed on the first body layer 111. The first pattern 112 may protrude from the first body layer 111 toward the front side.

A plurality of the first patterns 112 may be continuously formed in the first refractive layer 110. The first pattern 112 may continuously protrude on the first body layer 111. The first pattern 112 may be formed in an embossed pattern. The plurality of the first patterns 112 may be arranged at a first distance d1. The first pattern 112 may be formed to have a first height h1.

The first pattern 112 of the first refractive layer 110 may include a first inclined portion 113. The first inclined portion 113 may be configured to totally reflect some beams of light beams emitted from the backlight unit 60. The first inclined portion 113 may be configured to totally reflect some beams of light beams passing through the base layer 101. The first inclined portion 113 may be configured to totally reflect light beams incident in the front and rear direction among the light beams emitted from the backlight unit 60. The first inclined portion 113 may be configured to totally reflect some beams, which are obliquely incident with respect to the front and rear direction, among light beams passing through the third refractive layer 130 and the fourth refractive layer 140. The first inclined portion 113 may be provided in plural. The first inclined portion 113 may be formed in a straight line.

The first inclined portion 113 may be formed to be inclined with respect to a direction in which the first refractive layer 110 extends. The first inclined portion 113 may be formed to allow light, which is incident on the first refractive layer 110 in the front and rear direction, to have an incident angle, which is greater than a critical angle. The first inclined portion 113 may form opposite sides of the first pattern 112 with respect to the front and rear direction.

The first pattern 112 of the first refractive layer 110 may include a first parallel portion 114 extending in the same direction as the direction in which the first refractive layer 110 extends. The first parallel portion 114 may extend in a direction perpendicular to the front and rear direction. The first parallel portion 114 may be provided between the plurality of the first inclined portions 113. Accordingly, the first pattern 112 may have an approximately trapezoidal shape.

The first refractive layer 110 may include a second parallel portion 115 arranged between the plurality of the first patterns 112. The second parallel portion 115 may be formed at a first distance d1 at which the first patterns 112 are spaced apart from each other. The first inclined portion 113 and the second parallel portion 115 may form a space in which a first filling portion 121 of the second refractive layer 120 is arranged.

The second refractive layer 120 may be positioned in front of the first refractive layer 110. The second refractive layer 120 may have a lower refractive index than the refractive index of the first refractive layer 110. Because the second refractive layer 120 has a refractive index different from the first refractive layer 110, light beams passing sequentially through the first refractive layer 110 and the second refractive layer 120 may be totally reflected or refracted. The second refractive layer 120 may have a higher refractive index than the outer air layer.

The second refractive layer 120 may include the first filling portion 121 filling among the plurality of the first patterns 112. The first filling portion 121 may be positioned in a space between the first patterns 112. The first filling portion 121 may be formed to correspond to the size and shape of the space between the first patterns 112. The first filling portion 121 may be in contact with the first inclined portion 113. The first filling portion 121 may have the first height h1.

The third refractive layer 130 may be positioned at the rear of the base layer 101. The third refractive layer 130 may have a refractive index similar to that of the first refractive layer 110. The first refractive layer 110 and the third refractive layer 130 may be formed as a high refractive layer. The third refractive layer 130 may include a second body layer 131 and a second pattern 132 formed on the second body layer 131. The second pattern 132 may protrude rearward from the second body layer 131.

A plurality of second patterns 132 may be continuously formed on the third refractive layer 130. The second pattern 132 may continuously protrude on the second body layer 131. The second pattern 132 may be formed in an embossed pattern. The plurality of the second patterns 132 may be arranged at a second distance d2. The second distance d2 may be different from the first distance d1. The second distance d2 may be smaller than the first distance d1. The second pattern 132 may have a second height h2. The second height h2 may be different from the first height h1. The second height h2 may be smaller than the first height h1.

That is, because the size of the second pattern 132 is different from the size of the first pattern 112, the second pattern 132 may refract light, which is incident in the front and rear direction, in various directions and emit the light.

The second pattern 132 of the third refractive layer 130 may include a second inclined portion 133. The second inclined portion 133 may be configured to refract some beams of light beams emitted from the backlight unit 60. The second inclined portion 133 may be configured to refract some beams of the light beams passing through the fourth refractive layer 140. The second inclined portion 133 may be configured to refract some beams incident in the front and rear direction among the light beams emitted from the backlight unit 60. The second inclined portion 133 may be configured to refract some beams, which are obliquely incident with respect to the front and rear direction, among light beams passing through the fourth refractive layer 140. The second inclined portion 133 may be provided in plural. The second inclined portion 133 may be formed in a straight line.

The second inclined portion 133 may be formed to be inclined with respect to a direction in which the third refractive layer 130 extends. The second inclined portion 133 may be formed to allow light, which is incident on the third refractive layer 130 in the front and rear direction, to have an incident angle, which is smaller than a critical angle. The second inclined portion 133 may have the inclination angle less than that of the first inclined portion 113. The second inclined portion 133 may form opposite sides of the second pattern 132 with respect to the front and rear direction.

The second pattern 132 of the third refractive layer 130 may include a third parallel portion 134 extending in the same direction as the direction in which the third refractive layer 130 extends. The third parallel portion 134 may extend in a direction perpendicular to the front and rear direction. The third parallel portion 134 may be provided between the plurality of the second inclined portions 133. Accordingly, the second inclined portion 133 may have an approximately trapezoidal shape.

The third refractive layer 130 may include a fourth parallel portion 135 arranged between the plurality of the second patterns 132. The fourth parallel portion 135 may be formed at a second distance d1 at which the second patterns 132 are spaced apart from each other. The second inclined portion 133 and the fourth parallel portion 135 may form a space in which a second filling portion 141 of the fourth refractive layer 140 is arranged.

The fourth refractive layer 140 may be positioned at the rear of the third refractive layer 130. The fourth refractive layer 140 may have a lower refractive index than the third refractive layer 130. Because the fourth refractive layer 140 has a refractive index different from that of the third refractive layer 130, light passing sequentially through the fourth refractive layer 140 and the third refractive layer 130 may be refracted. The fourth refractive layer 140 may be arranged in front of the display panel 20. The fourth refractive layer 140 may be arranged in a front side of the polarizing sheet 22.

The fourth refractive layer 140 may include a second filling portion 141 filling among the plurality of the second patterns 132. The second filling portion 141 may be positioned in a space between the second patterns 132. The second filling portion 141 may be formed to correspond to the size and shape of the space between the second patterns 132. The second filling portion 141 may be in contact with the second inclined portion 133. The second filling portion 141 may have the second height h2.

Referring to FIG. 4, the light emitted from the backlight unit 60 may have a high proportion of light emitted in the front and rear direction and include components of light emitted in an oblique direction with respect to the front and rear direction. The light emitted in the front and rear direction in the backlight unit 60 and the light emitted in the oblique direction with respect to the front and rear direction may be incident on the optical film 100 after passing through the display panel 20.

Referring to FIG. 5, the light emitted from the backlight unit 60 is incident on the optical film 100 after passing through the display panel 20. Some beams of the light beams passing through the fourth refractive layer 140 may be incident on the third refractive layer 130 and then refracted. Particularly, light beams, which are incident on the second inclined portion 133 of the third refractive layer 130 among the light beams passing through the fourth refractive layer 140, may be refracted by the difference between the third refractive layer 130 and the fourth refractive layer 140. On the other hand, light beams, which are incident on the third parallel portion 134 or the fourth parallel portion 135 of the third refractive layer 130 among the light beams passing through the fourth refractive layer 140, may be incident on the third refractive layer 130 without the refraction.

The light passing through the third refractive layer 130 may sequentially pass through the base layer 101 and the first refractive layer 110.

Light passing through the first refractive layer 110 may be incident on the second refractive layer 120 and totally reflected and/or refracted. Some beams of the light beams incident on the second refractive layer 120 may be incident on the first inclined portion 113. The light incident on the first inclined portion 113 may be totally reflected by the first inclined portion 113. The light totally reflected by the first inclined portion 113 may be refracted by passing through the first parallel portion 114, and then emitted to the outside through the second refractive layer 120. The light totally reflected by the first inclined portion 113 may be refracted by the first inclined portion 113 that faces to each other, and then emitted to the outside through the second refractive layer 120. Because the outer is an air layer and has a lower refractive index than the second refractive layer 120, the light may be refracted upon being emitted to the outside from the second refractive layer 120. The light emitted to the outside after being totally reflected by the first inclined portion 113 may have a relatively large exit angle.

Some beams of the light beams incident on the second refractive layer 120 may be incident on the first parallel portion 114 or the second parallel portion 115. The light that is obliquely incident on the first parallel portion 114 may be refracted by the first parallel portion 114 and then emitted to the outside. The light perpendicularly incident on the first parallel portion 114 may be emitted to the outside without refraction. The light that is obliquely incident on the second parallel portion 115 may be refracted by the second parallel portion 115 and then emitted to the outside or may be refracted again by passing through the first inclined portion 113 and/or the first parallel portion 114 and then emitted to the outside. Because the outer is an air layer and has a lower refractive index than the second refractive layer 120, the light may be refracted upon being emitted to the outside from the second refractive layer 120.

Because the display apparatus 1 according to an embodiment of the disclosure includes the optical film 100 having the above-described configuration, the display apparatus 1 may mix light beams, which are emitted at various angles from the backlight unit 60, and emit the mixed light beams and thus it is possible to improve the viewing angle. That is, some beams of the light beams emitted from the backlight unit 60 may be firstly refracted by sequentially passing through the fourth refractive layer 140 and the third refractive layer 130 and then emitted at various angles. After that, the light may be secondarily totally reflected and/or refracted by the first refractive layer 110 and the second refractive layer 120 and then emitted to the outside at various angles. Further, other beams of the light beams emitted from the backlight unit 60 may be emitted in the front and rear direction by passing through the parallel portion 114, 115, 134, and 135. Accordingly, the display apparatus 1 may emit light in various directions, thereby improving the viewing angle.

As for the optical film 100 according to an embodiment, because the light is provided to the first refractive layer 110 after firstly being refracted by the third refractive layer 130 and the fourth refractive layer 140, it is possible to make the first height h1 of the first pattern 112, which is to totally reflect the light, relatively low and thus it is possible to easily process the first pattern 112.

In addition, because the external light is incident on the first refractive layer 110 after passing through the second refractive layer 120 having a relatively low refractive index, it is possible to prevent retro reflection caused by total reflection and thus it is possible to reduce the glare caused by the external light.

Figure 6:
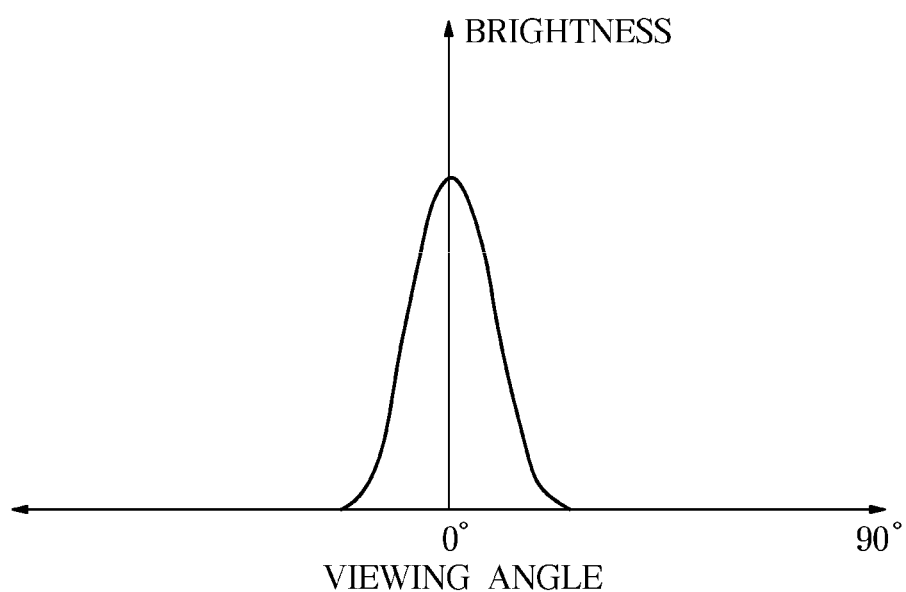
FIG. 6 is a graph illustrating the distribution of light emitted from a backlight unit according to another embodiment of the disclosure.

FIG. 6 is a graph illustrating the distribution of light emitted from a backlight unit according to another embodiment of the disclosure.

Hereinafter a description the same as those described in FIGS. 3 to 5 will be omitted.

Referring to FIG. 6, as for light emitted from a backlight unit 60, the proportion of light emitted in the front and rear direction may be very high. The backlight unit 60 may be configured to minimize an amount of light emitted in the oblique direction with respect to the front and rear direction and to maximize an amount of light in the front and rear direction. The backlight unit 60 may include a condensing film (not shown) for facilitating condensation.

When the display apparatus 1 includes the condensed backlight unit 60, the light beams emitted from the backlight unit 60 are refracted by the third refractive layer 130 and the fourth refractive layer 140, or totally reflected and/or refracted and emitted to the outside, as illustrated in FIG. 4.

Figure 7:
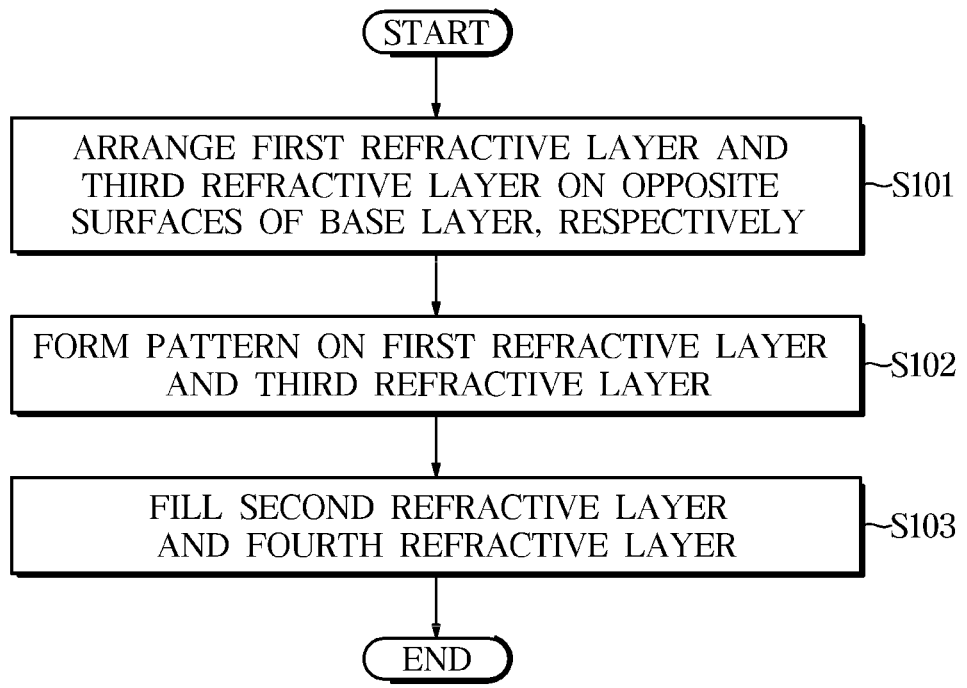
FIG. 7 is a flow chart illustrating a method of manufacturing the optical film shown in FIG. 2.

FIG. 7 is a flow chart illustrating a method of manufacturing the optical film shown in FIG. 2.

A method of manufacturing the optical film 100 according to an embodiment of the disclosure will be described with reference to FIG. 7.

Referring to FIG. 7, the first refractive layer 110 and the third refractive layer 130 are arranged on opposite surfaces of the base layer 101, respectively. The first refractive layer 110 and the third refractive layer 130 are formed of a material having a relatively high refractive index. The first refractive layer 110 and the third refractive layer 130 may be attached to opposite surfaces of the base layer 101, respectively.

Next, the base layer 101, to which the high refractive layers 110 and 130 are attached on opposite surfaces thereof, is moved to a pattern forming apparatus. The patterns 112 and 132 are formed on the first refractive layer 110 and the third refractive layer 130, respectively, in the pattern forming apparatus. The patterns 112 and 132 may be formed in an embossed pattern. Alternatively, the pattern may be formed in an engraved pattern.

The base layer 101 with the high refractive layers 110 and 130, on which the pattern forming process is completed, may be moved to a filling device. The filling device fills the first refractive layer 110 with the second refractive layer 120 and fills the third refractive layer 130 with the fourth refractive layer 140. The second refractive layer 120 has a refractive index lower than that of the first refractive layer 110, and the fourth refractive layer 140 has a refractive index lower than that of the third refractive layer 130.

By using a method of manufacturing the optical film 100 according to an embodiment, a process of forming a pattern on the high refractive layers 110 and 130 arranged on opposite surfaces of the base layer 101 is performed independently of a process of filling the high refractive layers 110 and 130 with the low refractive layers 120 and 140, and thus it is possible to simplify the manufacturing process and to reduce the loss in comparison with a conventional method of manufacturing the optical film in which the high refractive layer and the low refractive layer are laminated alternately.

Figure 8:
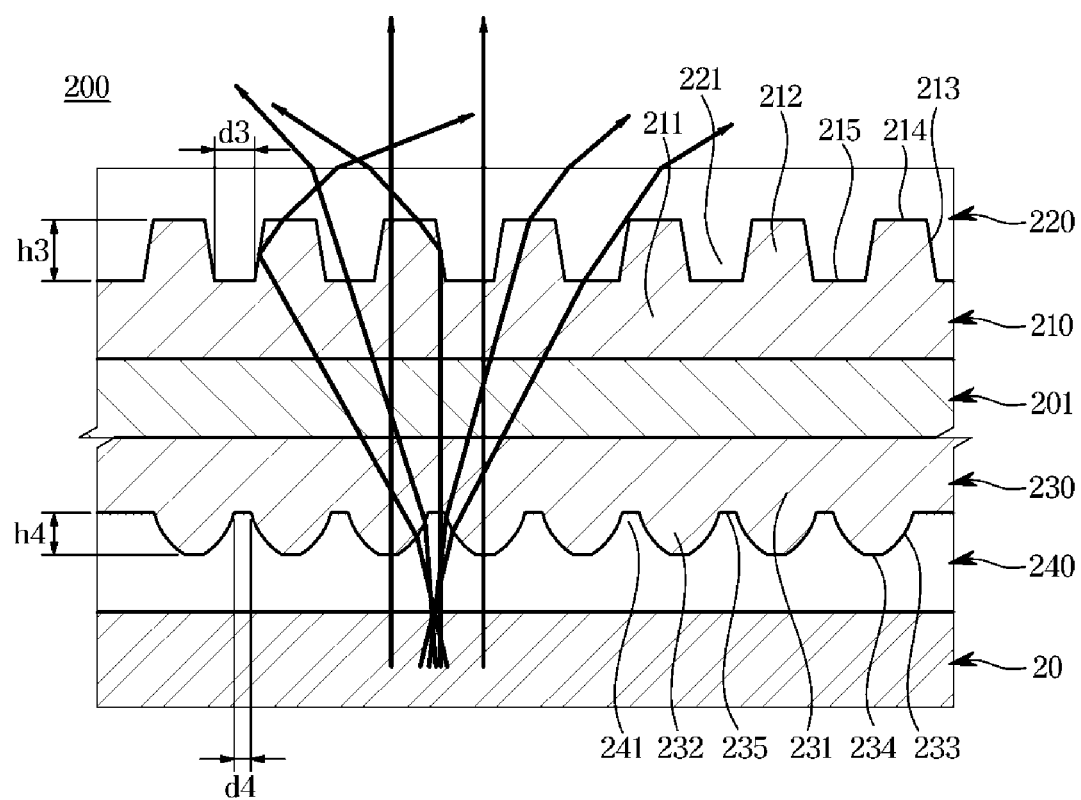
FIG. 8 is a cross-sectional view schematically illustrating an optical film according to another embodiment of the disclosure.

FIG. 8 is a cross-sectional view schematically illustrating an optical film according to another embodiment of the disclosure.

Hereinafter a description the same as those described in FIGS. 3 to 5 will be omitted.

Referring to FIG. 8, an optical film 200 according to another embodiment of the disclosure may include a base layer 201, a first refractive layer 210, and a second refractive layer 220, a third refractive layer 230, and a fourth refractive layer 240.

The first refractive layer 210 having a refractive index higher than that of the second refractive layer 120 may be arranged on one surface of the base layer 201 and the third refractive layer 230 having a refractive index higher than that of the fourth refractive layer 140 may be arranged on the other surface of the base layer 201.

The first refractive layer 210 may include a first body layer 211, a first pattern 212, a first inclined portion 213, a first parallel portion 214, and a second parallel portion 215.

The first pattern 212 may have a lower height than the first pattern 112 shown in FIGS. 3 to 5. That is, a third height h3 may be lower than the first height h1 shown in FIGS. 3 to 5.

A plurality of first patterns 212 may be continuously arranged at a third distance d3.

The second refractive layer 220 may be arranged in front of the first refractive layer 210. The second refractive layer 220 may include a first filling portion 221 filling between the first patterns 212.

The third refractive layer 230 may include a second body layer 231, a second pattern 232, a second curved portion 233, a third parallel portion 234, and a fourth parallel portion 235.

The second curved portion 233 of the second pattern 232 may be formed as a curved surface unlike the second inclined portion 133 of the second pattern 132 shown in FIGS. 3 to 5. The second curved portion 233 may be formed to refract light incident from the fourth refractive layer 240.

A fourth height h4 of the second pattern 232 may be lower than the third height h3 of the first pattern 212. The second pattern 232 may be formed in an embossed pattern.

A plurality of second patterns 232 may be continuously arranged at a fourth distance d4. The fourth distance d4 may be smaller than the third distance d3.

The fourth refractive layer 240 may be arranged at the rear of the third refractive layer 230. The fourth refractive layer 240 may include a second filling portion 241 filling between the second patterns 232.

By using the above-described configuration, the optical film 200 according to another embodiment of the disclosure may mix light beams, which are emitted at various angles from the backlight unit 60, and emit the mixed light beams at various angles, and thus it is possible to improve the viewing angle of the display apparatus 1.

Figure 9:
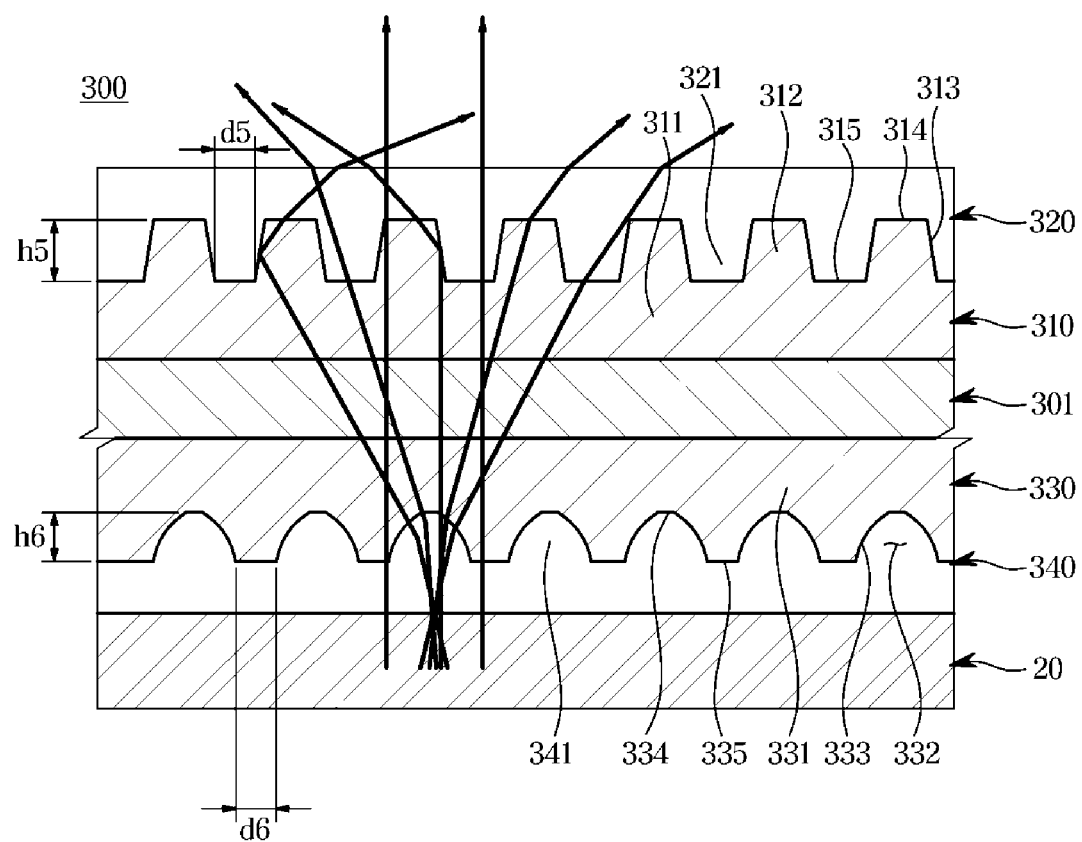
FIG. 9 is a cross-sectional view schematically illustrating an optical film according to yet another embodiment of the disclosure.

FIG. 9 is a cross-sectional view schematically illustrating an optical film according to yet another embodiment of the disclosure.

Hereinafter description of the same parts as those described above will be omitted.

Referring to FIG. 9, an optical film 300 according to another embodiment of the disclosure may include a base layer 301, a first refractive layer 310, a second refractive layer 320, a third refractive layer 330 and a fourth refractive layer 340.

The first refractive layer 310 having a refractive index higher than that of the second refractive layer 320 may be arranged on one surface of the base layer 301 and the third refractive layer 330 having a refractive index higher than that of the fourth refractive layer 340 may be arranged on the other surface of the base layer 301.

The first refractive layer 310 may include a first body layer 311, a first pattern 312, a first inclined portion 313, a first parallel portion 314, and a second parallel portion 315.

The first pattern 312 may have a fifth height h5. The fifth height h5 may be similar with the third height h3 shown in FIG. 8.

A plurality of first patterns 312 may be continuously arranged at a fifth distance d5. The fifth distance d5 may be similar with the third distance d3 shown in FIG. 8.

The second refractive layer 320 may include a first filling portion 321 filling between the first patterns 312.

The third refractive layer 330 may include a second body layer 331, a second pattern 332, a second curved portion 333, a third parallel portion 334, and a fourth parallel portion 335.

The second pattern 332 may be formed in an engraved pattern unlike the second pattern 232 shown in FIG. 8. The second pattern 332 may be a space filled by the second filling portion 341 of the fourth refractive layer 340.

The second curved portion 333 of the second pattern 332 may be formed as a curved surface like the second curved portion 233 shown in FIG. 8. The second curved portion 333 may be formed to refract light incident from the fourth refractive layer 340. A sixth height h6 of the second pattern 332 may be lower than the fifth height h5 of the first pattern 312.

A plurality of second patterns 332 may be continuously arranged at a sixth distance d6. The sixth distance d6 may be less than the fifth distance d5.

The fourth refractive layer 340 may include a second filling portion 341 filling a space in which the second patterns 332 are formed.

By using the above-described configuration, the optical film 300 according to another embodiment of the disclosure may mix light beams, which are emitted at various angles from the backlight unit 60, and emit the mixed light beams at various angles, and thus it is possible to improve the viewing angle of the display apparatus 1.

Figure 10:
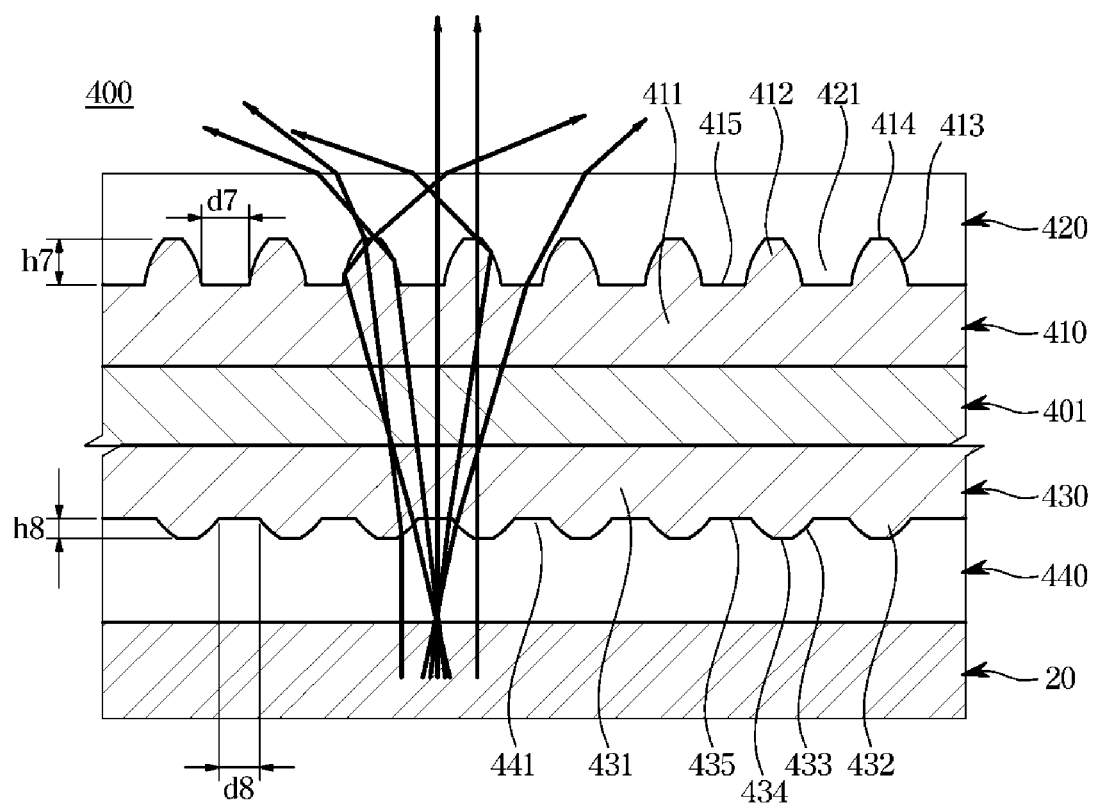
FIG. 10 is a cross-sectional view schematically illustrating an optical film according to yet another embodiment of the disclosure.

FIG. 10 is a cross-sectional view schematically illustrating an optical film according to yet another embodiment of the disclosure.

Hereinafter description of the same parts as those described above will be omitted.

Referring to FIG. 10, an optical film 400 according to another embodiment of the disclosure may include a base layer 401, a first refractive layer 410, a second refractive layer 420, a third refractive layer 430 and a fourth refractive layer 440.

The first refractive layer 410 having a refractive index higher than that of the second refractive layer 420 may be arranged on one surface of the base layer 401 and the third refractive layer 430 having a refractive index higher than that of the fourth refractive layer 440 may be arranged on the other surface of the base layer 401.

The first refractive layer 410 may include a first body layer 411, a first pattern 412, a first curved portion 413, a first parallel portion 414, and a second parallel portion 415.

The first pattern 412 may have a seventh height h7. A plurality of first patterns 412 may be continuously arranged at a seventh distance d7.

The first pattern 412 may include a first curved portion 413 formed in a curved surface, unlike the first pattern 112 shown in FIGS. 3 to 5 and the first pattern 212 shown in FIG. 8. The first curved portion 413 may be configured to totally reflect some beams of light beams, which are emitted from the backlight unit 60 and incident on the first pattern 412.

The second refractive layer 420 may include a first filling portion 421 filling between the first patterns 412.

The third refractive layer 430 may include a second body layer 431, a second pattern 432, a second curved portion 433, a third parallel portion 434, and a fourth parallel portion 435.

The second curved portion 433 of the second pattern 432 may be formed as a curved surface like the second curved portion 233 shown in FIG. 8. The second curved portion 433 may be formed to refract light incident from the fourth refractive layer 440. An eighth height h8 of the second pattern 432 may be lower than the seventh height h7 of the first pattern 412. The eighth height h8 of the second pattern 432 may be lower than the fourth height 4 as shown in FIG. 8.

A plurality of second patterns 432 may be continuously arranged at an eighth distance d8. The eighth distance d8 may be less than the seventh distance d7.

The fourth refractive layer 440 may include a second filling portion 441 filling a space between the second patterns 432.

By using the above-described configuration, the optical film 400 according to another embodiment of the disclosure may mix light beams, which are emitted at various angles from the backlight unit 60, and emit the mixed light beams at various angles, and thus it is possible to improve the viewing angle of the display apparatus 1.

As is apparent from the above description, the display apparatus may refract some beams of incident light beams and then totally reflect the some beams, thereby improving the viewing angle.

The display apparatus may be configured to allow external light to be incident on a refractive layer having a relatively low refractive index and then to be moved to a refractive layer having a relatively high refractive index, and thus the display apparatus may prevent retro-reflection caused by total reflection and improve the contrast ratio.

The display apparatus may simplify a manufacturing process by performing processes in the following order; arranging a high refractive layer on a front side and a rear side of a base layer; forming a pattern on the high refractive layer, and filling a low refractive layer.

The display apparatus may form a pattern on a first refractive layer so that light, which is refracted by a third refractive layer and a fourth refractive layer, is totally reflected by the first refractive layer and a second refractive layer, and thus it is possible to easily form the pattern in comparison with a case in which the third refractive layer and the fourth refractive layer are omitted.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus, comprising:
  a backlight unit configured to emit light;
  a display panel positioned to the front of the backlight unit; and
  an optical film positioned to the front of the display panel, the optical film including:
    a base layer,
    a first refractive layer positioned to the front of the base layer, the first refractive layer comprising:
      first patterns, each including a first non-perpendicular portion and a first parallel portion which extends in a first direction perpendicular to a front to rear direction of the optical film, and
      second parallel portions, each disposed between adjacent first patterns among the first patterns, wherein each second parallel portion extends in the first direction and is connected to a first parallel portion of one of the adjacent first patterns by a first non-perpendicular portion of the one of the adjacent first patterns,
    a second refractive layer positioned to the front of the first refractive layer and having a higher refractive index than air and a lower refractive index than the first refractive layer, the second refractive layer comprising a first filling portion filling between the first patterns,
    a third refractive layer positioned to the rear of the base layer, the third refractive layer comprising second patterns, and a fourth refractive layer positioned to the rear of the third refractive layer and having a lower refractive index than the third refractive layer, wherein the second patterns each include a second non-perpendicular portion configured to refract at least a portion of the light emitted from the backlight unit that passes through the fourth refractive layer, and a distance between the adjacent first patterns, corresponding to a length of a corresponding second parallel portion among the second parallel portions, is different from a distance between adjacent second patterns among the second patterns.

2. The display apparatus of claim 1, wherein the first non-perpendicular portion of each of the first patterns is configured to totally reflect a portion of the light emitted from the backlight unit.

3. The display apparatus of claim 1, wherein the first non-perpendicular portion has a greater inclination angle than the second non-perpendicular portion.

4. The display apparatus of claim 1, wherein each of the first patterns has a higher height than each of the second patterns.

5. The display apparatus of claim 1, wherein the fourth refractive layer comprises a second filling portion filling between the second patterns of the third refractive layer.

6. The display apparatus of claim 1, wherein the first patterns and the second patterns are embossed patterns.

7. The display apparatus of claim 2, wherein each of the second patterns includes a third parallel portion which extends in the first direction, and the third refractive layer comprises fourth parallel portions, each disposed between the adjacent second patterns, wherein each fourth parallel portion extends in the first direction and is connected to a third parallel portion of one of the adjacent second patterns by a second non-perpendicular portion of the one of the adjacent second patterns.

8. The display apparatus of claim 1, wherein the first non-perpendicular portion includes a curved portion configured to totally reflect a portion of the light emitted from the backlight unit.

9. The display apparatus of claim 1, wherein the second patterns include a curved portion.

10. The display apparatus of claim 9, wherein each of the second patterns of the third refractive layer is an engraved pattern.

11. A display apparatus, comprising:
a display panel; and
an optical film positioned to the front of the display panel, the optical film including:
a base layer,
a first refractive layer positioned to the front of the base layer, the first refractive layer comprising:
first patterns each comprising a first non-perpendicular portion configured to totally reflect a portion of light passing through the base layer and a first parallel portion which extends in a first direction perpendicular to a front to rear direction of the optical film, and
second parallel portions, each disposed between adjacent first patterns among the first patterns, wherein each second parallel portion extends in the first direction and is connected to a first parallel portion of one of the adjacent first patterns by a first non-perpendicular portion of the one of the adjacent first patterns,
a second refractive layer positioned to the front of the first refractive layer and having a higher refractive index than air and a lower refractive index than the first refractive layer, the second refractive layer comprising a first filling portion filling between the first patterns,
a third refractive layer positioned to the rear of the base layer, the third refractive layer comprising second patterns each comprising a second non-perpendicular portion configured to refract a portion of light incident from the display panel, and
a fourth refractive layer positioned to the rear of the third refractive layer and having a lower refractive index than the third refractive layer,
wherein a distance between the adjacent first patterns, corresponding to a length of a corresponding second parallel portion among the second parallel portions, is different from a distance between adjacent second patterns among the second patterns.

12. The display apparatus of claim 11, wherein the first patterns are embossed patterns.

13. The display apparatus of claim 11, wherein the second patterns are embossed patterns or engraved patterns, and the fourth refractive layer comprises a second filling portion filling between the second patterns.

14. The display apparatus of claim 11, wherein the first non-perpendicular portion has a greater inclination angle than the second non-perpendicular portion.

15. The display apparatus of claim 11, wherein each of the first patterns has a higher height than each of the second patterns.

16. A display apparatus, comprising:
a display panel;
a backlight unit configured to supply light to the display panel and provided such that a ratio of light emitted in a front and rear direction is greater than a ratio of light emitted in an oblique direction in the front and rear direction; and
an optical film positioned to the front of the display panel, the optical film including:
a base layer,
a first refractive layer positioned to the front of the base layer, the first refractive layer comprising:
first patterns, each comprising a first non-perpendicular portion configured to totally reflect a portion of light passing through the base layer and formed in an embossed pattern, and a first parallel portion which extends in a first direction perpendicular to a front to rear direction of the optical film, and
second parallel portions, each disposed between adjacent first patterns among the first patterns, wherein each second parallel portion extends in the first direction and is connected to a first parallel portion of one of the adjacent first patterns by a first non-perpendicular portion of the one of the adjacent first patterns,
a second refractive layer positioned to the front of the first refractive layer and having a higher refractive index than air and a lower refractive index than the first refractive layer, the second refractive layer comprising a first filling portion filling between the first patterns, a third refractive layer positioned to the rear of the base layer, the third refractive layer comprising second patterns each comprising a second non-perpendicular portion having an inclination angle less than an inclination angle of the first non-perpendicular portion to refract a portion of light incident from the display panel and formed in an embossed pattern, and a fourth refractive layer positioned to the rear of the third refractive layer and having a lower refractive index than the third refractive layer, the fourth refractive layer comprising a second filling portion filling between the second patterns, wherein a distance between the adjacent first patterns, corresponding to a length of a corresponding second parallel portion among the second parallel portions, is different from a distance between adjacent second patterns among the second patterns.

\* \* \* \* \*